United States Patent
Moriya et al.

(10) Patent No.: US 9,218,841 B1
(45) Date of Patent: Dec. 22, 2015

(54) METHOD OF ASSESSING RECORDING CHARACTERISTICS OF THERMALLY ASSISTED MAGNETIC HEAD

(71) Applicant: TDK Corporation, Tokyo (JP)

(72) Inventors: Makoto Moriya, Tokyo (JP); Hiroshi Kiyono, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 14/318,773

(22) Filed: Jun. 30, 2014

(51) Int. Cl.
| | |
|---|---|
| *G11B 11/00* | (2006.01) |
| *G11B 5/00* | (2006.01) |
| *G11B 13/08* | (2006.01) |
| *G11B 5/455* | (2006.01) |
| *G11B 5/48* | (2006.01) |
| *G11B 5/31* | (2006.01) |
| *G11B 5/60* | (2006.01) |
| G11B 27/36 | (2006.01) |

(52) U.S. Cl.
CPC .............. *G11B 13/08* (2013.01); *G11B 5/314* (2013.01); *G11B 5/455* (2013.01); *G11B 5/4866* (2013.01); *G11B 5/6088* (2013.01); *G11B 27/36* (2013.01); *G11B 2005/0021* (2013.01)

(58) Field of Classification Search
CPC ............ G11B 5/4866; G11B 2005/0021; G11B 5/314; G11B 5/6088; G11B 2005/001; G11B 7/1387; G11B 5/3116; G11B 5/3133; G11B 5/3136; G11B 13/08; G11B 7/1206; G11B 5/455; G11B 27/36
USPC .......... 369/13.33, 13.13, 13.32, 13.14, 112.27
See application file for complete search history.

(56) References Cited

U.S. PATENT DOCUMENTS

| 7,898,759 B2 * | 3/2011 | Matsumoto et al. ............ 360/59 |
| 8,125,858 B2 * | 2/2012 | Hara et al. .................. 369/13.33 |
| 8,374,060 B2 | 2/2013 | Shimazawa et al. |
| 8,614,934 B1 * | 12/2013 | Tomikawa et al. ......... 369/13.33 |

FOREIGN PATENT DOCUMENTS

| JP | 4840625 B2 | 10/2011 |
| JP | 2013-097819 A | 5/2013 |

* cited by examiner

*Primary Examiner* — Ali Neyzari
(74) *Attorney, Agent, or Firm* — Posz Law Group, PLC

(57) ABSTRACT

Using a thermally assisted magnetic recording head, reference signals are recorded into a magnetic recording medium; reproduction signal intensity of the reference signals is measured in a state where the thermally assisted magnetic head has been moved in the track width direction from the track width center of the track where the reference signals are recorded; a mean signal output of each sector in the track where the reference signals are recorded is calculated from the measurement results of the reproduction signal intensity of the reference signals; and the recording characteristics of a thermally assisted magnetic head are evaluated based upon the mean signal output of the sectors.

7 Claims, 8 Drawing Sheets

METHOD OF ASSESSING RECORDING CHARACTERISTICS OF THERMALLY ASSISTED MAGNETIC HEAD

FIELD OF THE INVENTION

The present invention relates to a method for evaluating recording characteristics of a thermally assisted magnetic head.

BACKGROUND OF THE INVENTION

In the field of magnetic recording using a head and a medium, further performance improvement of thin film magnetic heads and magnetic recording media is in demand in association with the high recording density of magnetic disc devices. As a thin film magnetic head, at present, a composite type thin film magnetic head made of a structure where a magnetoresistant (MR) element for reading and an electromagnetic transducer element for writing are laminated is widely used.

The magnetic recording medium is a discontinuous medium in which magnetic grains are aggregated, and each magnetic grain has a single magnetic domain structure. In the magnetic recording medium, one recording bit is configured by a plurality of magnetic grains. Consequently, in order to enhance the recording density, asperities at the border between adjacent recording bits need to be reduced by decreasing the size of the magnetic grains. However, if the magnetic grains are reduced in size, there is the problem that the thermal stability of magnetization of the magnetic grains is reduced in association with a decrease in the volume of the magnetic grain.

As a countermeasure against this problem, an increase of magneto anisotropy energy Ku of magnetic grains may be considered; however, the increase of Ku results in an increase in an anisotropy field (coercive force) of a magnetic recording medium. On the other hand, the upper limit of the recording magnetic field intensity of the thin film magnetic head is substantially determined by saturation magnetic flux density of a soft magnetic material configuring a magnetic core within the head. Consequently, if the anisotropy field of the magnetic recording medium exceeds the acceptable value determined by the upper limit of the recording magnetic field intensity, it becomes impossible to write to the magnetic recording medium. Currently, as a method to solve such a thermal stability problem, a so-called thermally assisted magnetic recording method is proposed in which, while a magnetic recording medium made from a magnetic material with large Ku is used, under a state where the anisotropy field is reduced by heating the magnetic recording medium, a recording magnetic field is applied to record information.

In this thermally assisted magnetic recording method, a method using a near-field light (NF light) probe comprising a metal piece that generates an NF light from plasmon excited by laser light, a so called plasomon generator, is generally known, and as a magnetic head including such a plasmon-generator, a magnetic head including a magnetic pole, a waveguide, a plasmon-generator facing the waveguide and a laser diode as a light source is proposed (U.S. patent application Ser. No. 13/046,117).

In this thermally assisted magnetic head, when laser light is irradiated to a waveguide from a laser diode, the light that has propagated through the waveguide is coupled with the plasmon-generator in the surface plasmon mode to excite surface plasmon. The propagation of this surface plasmon through the plasmon-generator will cause the generation of NF light at a NF light generating portion positioned at an edge part of the plasmon-generator that is opposite to the recording medium surface. The magnetic recording medium is then heated by irradiating the magnetic recording medium with the NF light generated at the NF light generating portion of the plasmon-generator, and information is written by applying a magnetic field in a state where the anisotropy field of the magnetic recording medium is reduced.

In a thermally assisted magnetic disk device including such a thermally assisted magnetic head, in order to accomplish stable magnetic writing with high recording density and a high SN ratio, it is an important factor that the light intensity of the NF light irradiated onto the magnetic recording medium be stable; i.e., the output intensity of laser light from the laser diode as a light source is constantly maintained. However, the output intensity of the laser light from the laser diode can fluctuate due to temperature increase and the like of the laser diode. Consequently, in a thermally assisted magnetic head, pre-shipment inspection to test whether the temperature of the laser diode is at or below the guaranteed operating temperature at the time of driving the laser diode is required.

As a method where such an inspection is implementable, a method is proposed in which the oscillation wavelength of a semiconductor laser is measured and the temperature of the semiconductor laser is calculated from the oscillation wavelength. When the calculated temperature of the semiconductor laser falls outside of the pre-set temperature range, the thermally assisted magnetic head is then determined to be a defective product (JP 2013-97819).

SUMMARY OF THE INVENTION

It is an object of the present invention to provide a method for accurately evaluating the recording characteristics of a thermally assisted magnetic head.

In order to accomplish the above objective, the present invention provides: a method for evaluating the recording characteristics of a thermally assisted magnetic head including a magnetic pole that generates a writing magnetic field from one end surface; a waveguide where light for exciting surface plasmon propagates; a plasmon-generator that generates near field light (NF light) from a NF light generating portion on a NF light generating end surface positioned on one end surface by coupling the light in a surface plasmon mode; and a light source that irradiates the waveguide with light by applying a predetermined drive current, including the steps of:

recording a reference signal to each sector on at least one track of a magnetic recording medium using the thermally assisted recording medium;

moving the thermally assisted magnetic head in the track width direction from the track width center of the track where the reference signals are recorded in the magnetic recording medium;

measuring the reproduction signal intensity of the reference signals using the thermally assisted magnetic head in a state where the thermally assisted magnetic head has been moved;

calculating the mean signal output of each sector of the track where the reference signals are recorded from the measurement results of the reproduction signal intensity of the reference signal; and evaluating the recording characteristics of the thermally assisted magnetic head based on the mean signal output of the each sector (Invention 1).

The magnetic write width (MWW) of a signal recorded in a magnetic recording medium using a thermally assisted magnetic head is one of the important recording characteristics of a thermally assisted magnetic head. If the MWW becomes greater than the design value, a signal(s) recorded in an adjacent track(s) is likely to be erased. The MWW depends upon the light intensity of NF light irradiated to a magnetic recording medium from a plasmon-generator and an intensity of a magnetic field applied to the magnetic recording medium from a magnetic pole. If the light intensity of the NF light and/or the magnetic field intensity fluctuates, the MWW fluctuates accordingly, and a stable magnetic recording is likely to be difficult. Consequently, in a thermally assisted magnetic head, in order to enable stable magnetic recording without fluctuation of the MWW, it is necessary to maintain the light intensity of NF light that is irradiated onto the magnetic recording medium constant, while maintaining the intensity of the magnetic field applied on the magnetic recording medium constant.

A typical laser diode as a light source provided in the thermally assisted magnetic head emits laser light because a predetermined drive current is applied. If the light intensity of the laser light is constant, i.e., if a drive current applied to the laser diode is constant, theoretically, the light intensity of the NF light irradiated to the magnetic recording medium from the plasmon-generator also becomes constant. However, actually, even if the drive current applied to the laser diode is constant, the light intensity of the laser light emitted from the laser diode may fluctuate instantaneously or for a short while. For example, while signals are recorded in a circumference of the track of the magnetic recording medium, the light intensity of the laser light may fluctuate. It is believed that this is caused by the fluctuation of the output of the laser light instantaneously or for a short while because a portion of the laser light emitted from the laser diode is returned to the laser diode from the waveguide or the plasmon-generator.

When the light intensity of this laser light fluctuates, if the light intensity of the NF light is decreased and the MWW also fluctuates due to the decrease, it is believed that the recording characteristics of the thermally assisted magnetic head can be evaluated by detecting the fluctuation of the light intensity of the laser light. However, actually, when the light intensity of the laser light fluctuates, the MWW does not necessarily fluctuate. FIG. 4 is graph showing the temporal fluctuation of the output of the laser light from the laser diode (fluctuation in one circumference of the track) when signals are recorded on one track, and FIG. 5 is a graph showing magnetic write width MWW in each sector of one track of the magnetic recording medium. As shown in FIG. 4 and FIG. 5, when an output of the laser light fluctuates, there is a case where the MWW also fluctuates correspondingly to that fluctuation (see portions indicated by the symbol A in FIG. 4 and FIG. 5). Despite the fluctuation of the output of the laser light, there is another case where the MWW does not substantially fluctuate (see portions indicated by the symbol B in FIG. 4 and FIG. 5). From these graphs, even if the fluctuation of the light intensity of the laser light is regarded as an index, it is understood that it is difficult to precisely evaluate the stability of the MWW as recording characteristics of a thermally assisted magnetic head.

The stability of the MWW as recording characteristics of the thermally assisted magnetic head can be certainly evaluated according to a method for actually recording a signal onto a magnetic recording medium and for measuring MWW. However, since it takes an enormous amount of time to measure the MWW, it is not realistic to measure the MWW of all of the thermally assisted magnetic heads before shipment.

According to the above invention (Invention 1), since the MWW of the reference signal recorded in the magnetic recording medium can be assumed from the mean signal output of each sector where the reference signal is recorded, the recording characteristics of the thermally assisted magnetic head caused by the fluctuation of the light intensity of the NF light irradiated onto the magnetic recording medium can be precisely evaluated.

In the invention above (Invention 1), when the reference signal is recorded into a magnetic recording medium, it is preferable to apply a greater current than the design value of the drive current applied to the light source (Invention 2).

In the invention above (Invention 1), it is preferable to move the thermally assisted magnetic head inwardly or outwardly by 40% to 60% of the design value of the MWW in a thermally assisted magnetic head based upon the track width center (Invention 3).

In the invention above (Invention 1), it is preferable to further include a step of measuring the reproduction signal intensity of the reference signals in a state where the thermally assisted magnetic head is positioned in the track width center, and to calculate the mean signal output of each sector of the track where the reference signals are recorded based on the measurement results of the reproduction signal intensity of the reference signals measured in a state where the thermally assisted magnetic head has been moved, and based on the measurement results of the reproduction signal intensity of the reference signal measured in a state where the thermally assisted magnetic head is positioned at the track width center (Invention 4).

In the invention above (Invention 1), when every mean signal output in each sector is within the range of ±2.5% of the design value of the track mean signal output, it is preferable to evaluate the thermally assisted magnetic head as a good product (Invention 5).

In the invention above (Invention 5), a maximum value and a minimum value of the mean signal outputs in each sector are extracted, and when both the maximum value and the minimum value of the mean signal outputs are within the range of ±2.5% of the design value of the track mean signal output, it is preferable to evaluate the thermally assisted magnetic head as a good product (Invention 6).

Further, the present invention provides a method for evaluating recording characteristics of a thermally assisted magnetic head including a magnetic pole that generates a writing magnetic field from one end surface; a waveguide where light for exciting surface plasmon propagates; a plasmon-generator that generates NF light from a NF light generating portion on the NF light generating end surface positioned on the one end surface by coupling with the light in the surface plasmon mode; and a light source that irradiates the waveguide with light by applying a predetermined drive current, including the steps of:

recording a reference signal on at least one track of a magnetic recording medium using the thermally assisted magnetic head;

measuring the magnetic write width (MWW) of each sector of the track where the reference signals are recorded; and evaluating recording characteristics of the thermally assisted magnetic head based upon the MWW of each sector (Invention 7).

According to the present invention, a method for accurately evaluating the recording characteristics of the thermally assisted magnetic head can be provided.

DETAILED DESCRIPTION OF THE INVENTION

Before explaining the embodiments of the present invention, terminology used herein is defined. In a lamination structure or an element structure formed on an element formation surface of a slider substrate of the thermally assisted magnetic head in one embodiment of the present invention, viewed from a layer or an element that is a standard, a substrate side is referred to as "downward", and its opposite side is referred to as "upward". Further, in the thermally assisted magnetic head in one embodiment of the present invention, the "X, Y and Z-axis directions" in some of the drawings are defined as needed. Herein, the Z-axis direction is the "vertical direction" as mentioned above, and the +Z side is equivalent to the trailing side, and the −Z side is equivalent to the leading side. Further, the Y-axis direction is referred to as the track width direction, and the X-axis direction is referred to as the height direction.

[Method for Evaluating the Recording Characteristics of a Thermally Assisted Magnetic Head]

Figure 1:
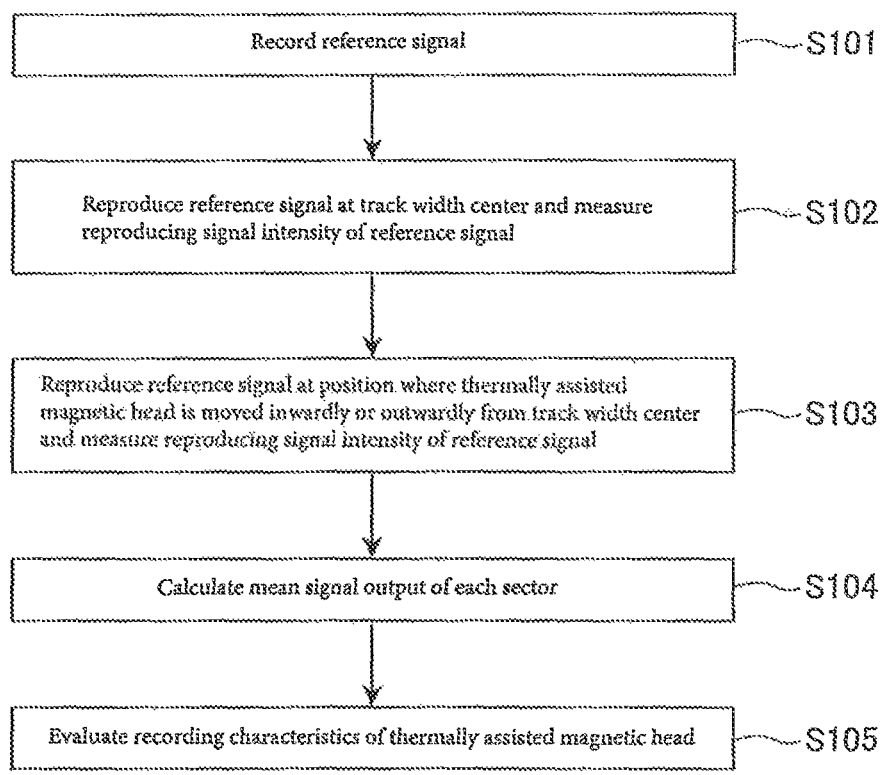
FIG. 1 is a flowchart showing a method for evaluating recording characteristics of a thermally assisted magnetic disk device according to one embodiment of the present invention.

A method for evaluating the recording characteristics of a thermally assisted magnetic head relating to one embodiment of the present embodiment is explained with reference to drawings. FIG. 1 is a flowchart showing the evaluating method relating to the present embodiment.

In the present embodiment, first, a thermally assisted magnetic head, which is the subject for evaluation of the recording characteristics, and a magnetic disk (a magnetic recording medium) for perpendicular magnetic recording are prepared. An exemplary magnetic disk includes a structure where a soft magnetic under layer, an intermediate layer and a magnetic recording layer (perpendicular magnetization layer) are sequentially laminated onto a disk substrate. Further, an exemplary thermally assisted magnetic head includes a magnetic pole that faces a surface of a magnetic disk at predetermined intervals (flying height), and that generates a recording magnetic field from an end surface constituting a portion of an air bearing surface (ABS) as a recording medium opposite surface, a waveguide where light for exciting a surface plasmon propagates, a plasmon-generator that generates near-field light (NF light) from a NF light generating end surface constituting a portion of ABS by coupling with the light in a surface plasmon mode, a laser diode as a light source that emits laser light to the waveguide, and an MR element for reproducing a signal from the magnetic disk. Furthermore, the details of the specific configuration (one example) of the thermally assisted magnetic head, the magnetic disk and the thermally assisted magnetic disk device including the above features will be described later.

Next, a drive current is applied to a laser diode of the thermally assisted magnetic head, laser light is emitted to the waveguide, and NF light is generated from the plasmon-generator. Then, a recording magnetic field is applied to the magnetic disk from the thermally assisted magnetic head when the NF light is irradiated onto the magnetic disk, and reference signals are recorded on at least one track of the magnetic disk (S101).

A position on the magnetic disk of the track where the reference signals will be recorded in a diametral direction can be suitably set to be within a movable range of the thermally assisted magnetic head in the diametral direction of the magnetic disk, and as long as the thermally assisted magnetic head is positioned inside the inner boundary part or outside the outer boundary part of the track width direction (cross track direction) on the track, the position is not limited.

It is preferable that a drive current that is greater than the design value (optimum drive current) for the drive current applied to a laser diode of thermally assisted magnetic head be applied to the laser diode of the thermally assisted magnetic head. In the present embodiment, the optimum drive current is applied to the laser diode to generate NF light from the plasmon-generator. However, actually, at the time of writing using a thermally assisted magnetic disk device including a thermally assisted magnetic head, in-device temperature rises due to the environmental temperature and the like of the device, which may affect the laser oscillation in the laser diode. Consequently, in the present embodiment, a state where the laser diode is exposed to an ambient temperature equivalent to the in-device temperature (approximately 80° C. or less) at the time of actual writing using the thermally assisted magnetic disk device including the thermally assisted magnetic head is created by applying a drive current greater than the optimum drive current to the laser diode, and the recording characteristics of the thermally assisted magnetic head can be precisely evaluated by generating NF light from the plasmon-generator in that state.

Figure 2:
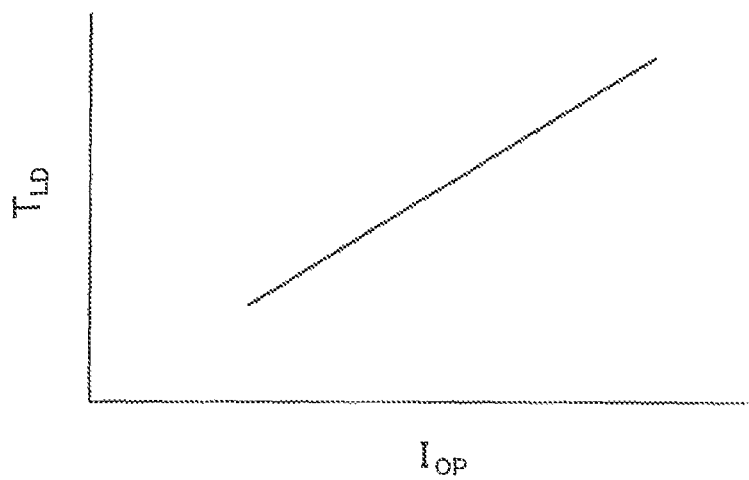
FIG. 2 is a graph showing the correlation between a drive current value applied to a laser diode of the thermally assisted magnetic head and temperature of the laser diode in one embodiment of the present invention.

Therefore, the drive current applied to the laser diode can be arbitrarily set so that the laser diode can be exposed to the ambient temperature equivalent to the in-device temperature at the time of actual writing using a thermally assisted magnetic disk device including the thermally assisted magnetic head. The correlation between the drive current value $I_{OP}$ applied to the laser diode and the temperature of the laser diode $T_{LD}$ is pre-obtained as shown in the graph in FIG. 2, and the drive current can be calculated based upon the correlation relationship.

It is preferable that the reference signals be recorded under conditions having the same signal intensity in each sector of one track. In other words, the drive current applied to the laser diode and the recording magnetic field applied to the magnetic disk are maintained constant, and the reference signals are recorded onto one track. The magnetic write width (MWW) as the recording characteristics of the thermally assisted magnetic head evaluated in the present embodiment is determined by the light intensity of the NF light irradiated onto the magnetic disk and the magnetic field intensity of the recording magnetic field applied to the magnetic disk from the magnetic pole. Consequently, The reference signals are recorded while the drive current applied to the laser diode and the recording magnetic field applied to the magnetic disk are maintained constant, so it becomes possible to evaluate whether or not the MWW fluctuates due to instantaneous or short-term fluctuation of the laser light irradiated from the laser diode based on the output signal intensity of the reference signals.

Next, when the thermally assisted magnetic head is positioned in the center (geometric track width center) of the track where the reference signals are recorded in the track width direction (cross track direction), the reference signal recorded in each sector of the track is reproduced using the thermally assisted magnetic head, and reproduction signal intensity of the reference signal is measured per sector (S102).

As described later, in the present embodiment, the thermally assisted magnetic head is moved inwardly or outwardly along the track width direction (cross track direction) from the geometric track width direction of the track where the reference signals are recorded, and the mean signal output of each sector is calculated based upon the reproduction signal intensity of the reference signal measured in that state, and the recording characteristics of the thermally assisted magnetic head are evaluated using the mean signal output as an index. However, the reproduction signal intensity recorded by the thermally assisted magnetic head can fluctuate not only by the light intensity of the NF light (in other words, the light intensity of a laser light emitted from the laser diode), but also by various other factors, such as the magnetic field intensity of the recording magnetic field applied to the magnetic disk, the temperature within the thermally assisted magnetic disk device and the like. Consequently, positioning of the thermally assisted magnetic head in the center of the track where the reference signals are recorded in the track width direction, and measurement of the reproduction signal intensity of the reference signal recorded in each sector of the track enable factor(s) other than the light intensity of the NF light (such as the intensity of a recording magnetic field) to be removed as the fluctuation factors of the reproduction signal intensity of the reference signal from the mean signal output as the index above. Therefore, the recording characteristics of the thermally assisted magnetic head can be more precisely evaluated.

Subsequently, the thermally assisted magnetic head is moved inwardly or outwardly along the track width direction (cross track direction) from the geometric track width center of the track where the reference signals are recorded, the reference signal recorded in each sector of the track is reproduced in this state, and the reproduction signal intensity of the reference signal is measured per sector (S103).

The distance to move the thermally assisted magnetic head from the geometric track width center is not particularly limited; however, it is preferably a length of 40% to 60% with respect to the design value of the MWW in the thermally assisted magnetic head, and more preferably a length of approximately 50% with respect to the design value of the MWW.

Figure 3:
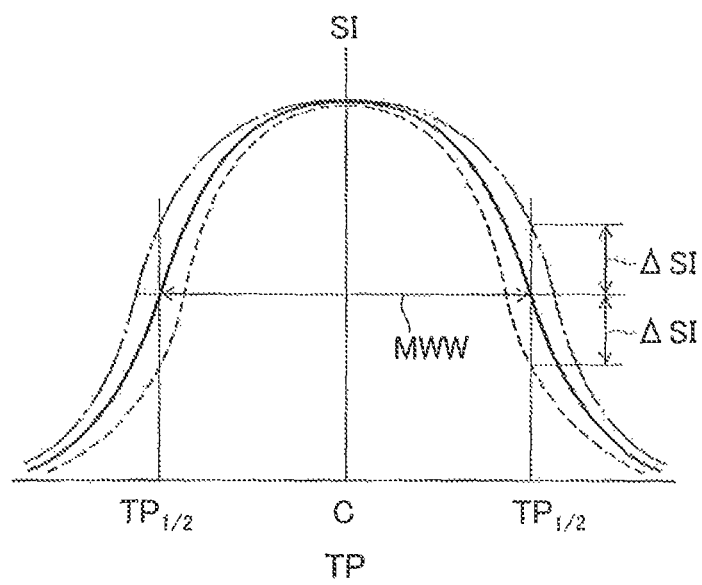
FIG. 3 is a profile showing the reproduction signal intensity SI of the reference signals recorded in a sector in a position of the sector of the magnetic disk in the track width direction in one embodiment of the present invention.
Figure 4:
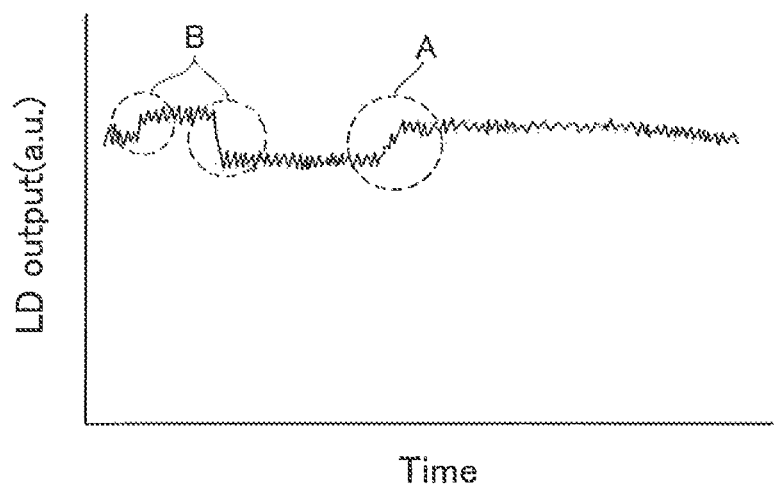
FIG. 4 is a graph showing the temporal fluctuation (fluctuation in one circumference of a track) of the output of laser light from a laser diode when signals are recorded on one track of the magnetic disk.
Figure 5:
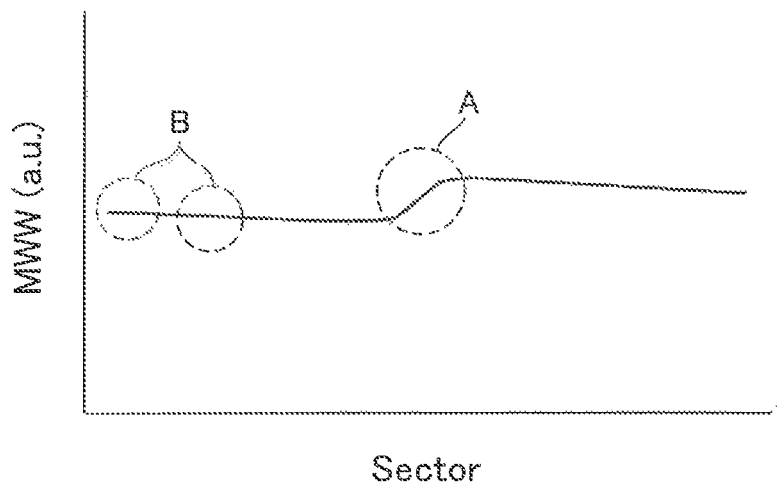
FIG. 5 is a graph showing magnetic write width in each sector of one track of the magnetic disk.

As shown in FIG. 3, the reproduction signal intensity Sop of the reference signal recorded in each sector is shown by normal distribution where the geometric track width center C of the sector is indicated as the peak. Furthermore, FIG. 3 is a profile showing the reproduction signal intensity SI of the reference signals recorded in the sectors in the position TP of the sector in the track width direction. The magnetic write width MWW is the width where the signals are recorded at ½ of the signal intensity of the reproduction signal intensity Sop of the geometric track width center C in the sectors. Comparing a case of recording the signals with a normal MWW (the profile indicated by the solid line in FIG. 3) and a case of recording the signals with an abnormal MWW (the profile indicated by the broken line and a dashed-dotted line), in the position $TP_{1/2}$ inwardly or outwardly approximately 50% of the normal magnetic write width MWW from the geometric track width center C, a difference ASI of the reproduction signal intensity becomes greater. However, in the vicinity of the geometric track width center C, or in a position further inwardly or outwardly than the position $TP_{1/2}$, the difference ASI of the reproduction signal intensity becomes smaller, and it is difficult for the fluctuation of the magnetic write width MWW to appear as the difference $\Delta$SI of the reproduction signal intensity. A reader (such as an MR element) in the thermally assisted magnetic head has a reading sensitivity distribution in the track width direction. Consequently, in the vicinity of the position $TP_{1/2}$, the reference signals are reproduced in a portion with relatively-high reading sensitivity in the vicinity of the center of the reader in the track width direction, and the reproduction signal intensity can be measured. However, in a position further inwardly or outwardly from the position $T_{1/2}$, the reference signals are reproduced in a portion with relatively-low reading sensitivity in the vicinity of the end part of the reader in the track width direction, and the reproduction signal intensity is measured. Therefore, if the distance to move the thermally assisted magnetic head is less than 40% or exceeds 60% with respect to the design value of the MWW (normal MWW), the difference $\Delta$SI between the reproduction signal intensity of the reference signals recorded with the normal MWW and that recorded with abnormal MWW becomes smaller, and it becomes difficult to precisely evaluate the recording characteristics of the thermally assisted magnetic head.

Next, the mean signal output of each sector is calculated from the reproduction signal intensity measured in the geometric track width center of each sector, and the reproduction signal intensity measured in the position where the thermally assisted magnetic head has been moved from the geometric track width center (S104). Specifically, the mean signal output of each sector can be calculated by subtracting the variation amount of the reproduction signal intensity of each sector measured in the geometric track width center from the mean value of the reproduction signal intensity in each sector measured in a position where the thermally assisted magnetic head has been moved. Furthermore, the variation amount of the reproduction signal intensity measured in the geometric track width center can be calculated as a numerical value based upon the minimum value when a minimum value out of the reproduction signal intensity of each sector is regarded as zero.

Lastly, it is determined whether or not the mean signal output of each sector calculated as mentioned above is within the acceptable range, and the recording characteristics of the thermally assisted magnetic head are evaluated (S105).

As shown in FIG. 3, as the MWW as the recording characteristic of the thermally assisted magnetic head becomes greater, the reproduction signal output SI measured in the position where the thermally assisted magnetic head has been moved from the geometric track width center becomes greater, so the mean signal output of each sector calculated from these also becomes greater. In the meantime, the production signal output SI measured in the geometric track width center is substantially the same regardless of the magnetic write width MWW of the thermally assisted magnetic head. Herein, the design value of a track mean signal output TAA in the thermally assisted magnetic disk device is the track mean signal output in the geometric track width center. Consequently, in S105 above, the track mean signal output in the position moved by a length of 40% to 60% with respect to the design value of the MWW from the geometric track width center, is calculated from the design value of the track mean signal output TAA, and an acceptable range is pre-obtained based upon the track mean signal output at the moved position. Then, it is determined whether or not the mean signal output of each sector calculated as mentioned above is within the acceptable range. If the mean signal output of each sector calculated as mentioned above is within the acceptable range defined based on the design value of the track mean signal output in the thermally assisted magnetic disk device, it is presumed that the fluctuation of the MWW is also within the acceptable range, and it can be evaluated as a thermally assisted magnetic head where stable magnetic recording is possible, i.e., the thermally assisted magnetic head can be evaluated as a good product. In the meantime, out of the mean signal outputs of various sectors, if the mean signal output of at least one sector exceeds the acceptable range, it is presumed that the fluctuation of the MWW also exceeds the acceptable range, and it can be evaluated as a thermally assisted magnetic head where stable magnetic recording is difficult, i.e., the thermally assisted magnetic head can be evaluated as a defective product.

The above acceptable range can be suitably set according to the acceptable range of the variation amount of the MWW. For example, the above acceptable range is preferably within the range of ±2.5% with respect to the track mean signal output in the position where the thermally assisted magnetic head has been moved from the geometric track width center, and, in particular, more preferably within the range of +1.0% is. If the above acceptable range is within +2.5%, the variation amount of the MWW can also be evaluated as the same level, and it can be evaluated that sufficiently-stable magnetic recording is possible.

Furthermore, in S105 above, a maximum value and a minimum value are extracted out of the mean signal outputs of various sectors calculated in S104 above. If both the extracted maximum and minimum values are within an acceptable range, the thermally assisted magnetic head is evaluated as a good product, and if either or both of the extracted maximum and minimum values of the mean signal outputs are out of the acceptable range, the thermally assisted magnetic head may be evaluated as a defective product. Such a process can effectively reduce data processing volume while the recording characteristics of the thermally assisted magnetic head are evaluated from the mean signal output of the various sectors.

As described above, according to the method for evaluating recording characteristics relating to the present embodiment, the recording characteristics of the thermally assisted magnetic head can be evaluated with accuracy. In particular, because the MWW is presumed relative to the reproduction signal intensity of the reference signals recorded in the magnetic recording medium, the recording characteristics of the thermally assisted magnetic head can be promptly evaluated. Therefore, it can be stated that this is useful as a method for inspecting the recording characteristics of all the thermally assisted magnetic heads before shipment.

[Thermally Assisted Magnetic Disk Device]

Next, one example of specific configuration of the thermally assisted magnetic disk device including the thermally assisted magnetic head that is a subject for evaluating of characteristics in the present embodiment is explained.

Figure 6:
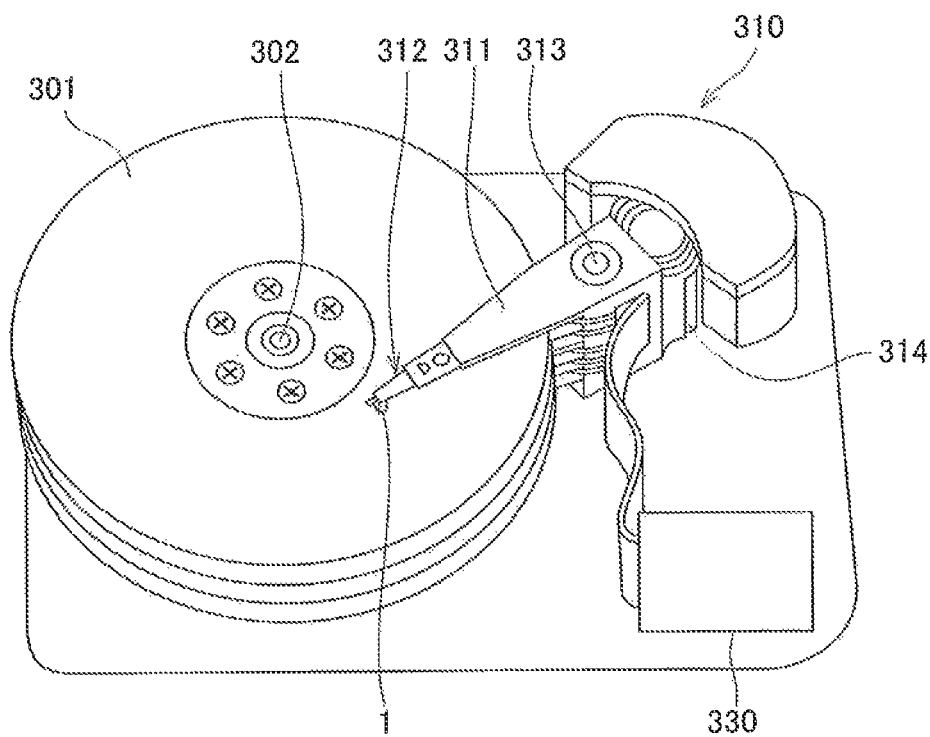
FIG. 6 is a perspective view schematically showing the configuration (one example) of the thermally assisted magnetic disk device, which is the subject for evaluation of characteristics, in one embodiment of the present invention.
Figure 7:
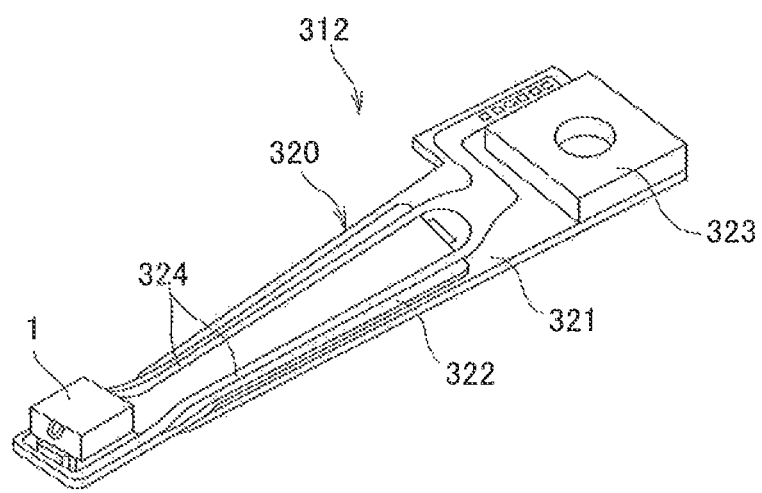
FIG. 7 is a perspective view schematically showing a head gimbal assembly (HGA) in one embodiment of the present invention.
Figure 8:
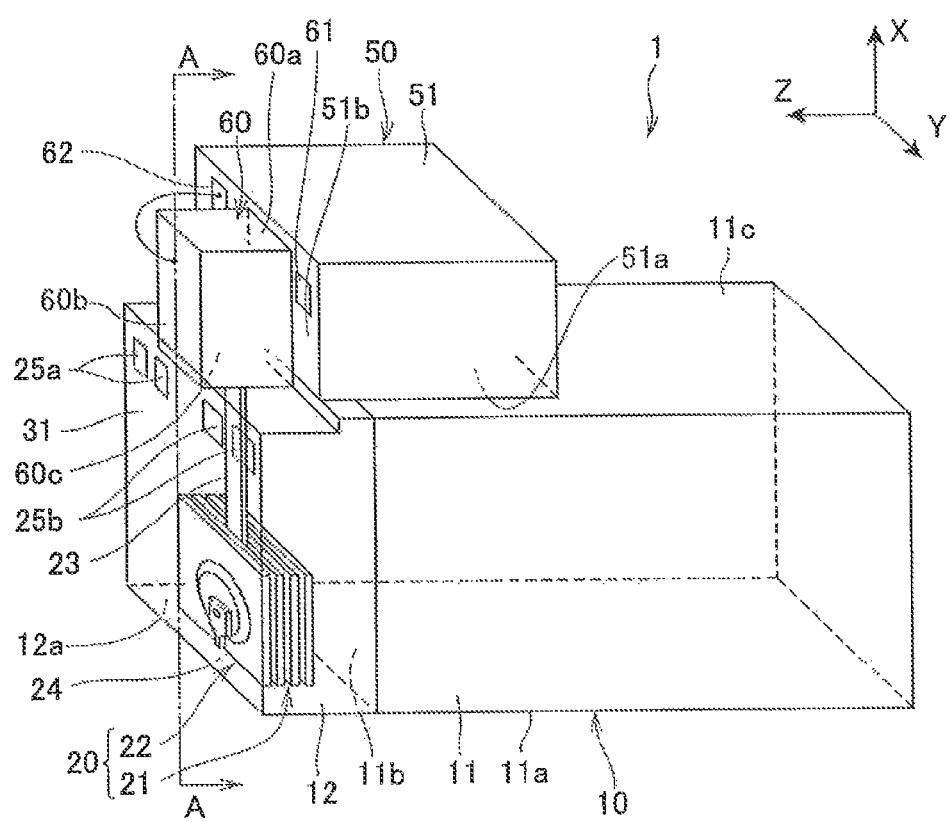
FIG. 8 is a perspective view showing a magnetic head in one embodiment of the present invention.

FIG. 6 is a perspective view schematically showing the thermally assisted magnetic disk device in the present embodiment, FIG. 7 is a perspective view schematically showing a head gimbal assembly (HGA) in the present embodiment, and FIG. 8 is a perspective view showing the thermally assisted magnetic head in the present embodiment.

As shown in FIG. 6, the thermally assisted magnetic disk device in the present embodiment includes a plurality of magnetic disks 301 that rotate around the rotation axis of a spindle motor 302, an assembly carriage device 310 where a plurality of drive arms 311 are provided, a head gimbal assembly (HGA) 312 that is attached to the front end of each drive arm 311, and that has a thermally assisted magnetic head 1 that is a thin film magnetic head, and a control circuit 330 for controlling writing and reading operations of the thermally assisted magnetic head 1, and for controlling the light emission operation of the laser diode that is a light source for generating laser light for thermally assisted magnetic recording described later.

In the present embodiment, the magnetic disk 301 is for perpendicular magnetic recording, and has a structure where a soft magnetic under layer, an intermediate layer and a magnetic recording layer (perpendicular magnetization layer) are sequentially laminated onto a disk substrate.

The assembly carriage device 310 is a device for positioning the thermally assisted magnetic heads 1 on a track of the magnetic disk 301. In the assembly carriage device 310, the drive arms 311 are stacked in the direction along a pivot bearing shaft 313, and can be angularly swingable to set on the pivot bearing shaft 313 as the center by a voice coil motor (VCM) 314.

Furthermore, the structure of the thermally assisted magnetic disk device in the present embodiment is not limited to the structure above, but the magnetic disks 301, the drive arms 311, HGAs 312 and the thermally assisted heads 1 may be singular.

In the HGA 312 shown in FIG. 7, a suspension 320 includes a load beam 321, a flexure 322 that is affixed to the load beam 321, and, that has flexibility, and a base plate 323 provided at a base portion of the load beam 321. Further, a wiring member 324 made of a lead conductor and connection pads that are electrically connected to the both ends of the lead conductor is provided on the flexure 322. The thermally assisted magnetic head 1 is affixed to the flexure 322 at the front end of the suspension 320 so as to face the surface of each magnetic disk 301 with predetermined intervals (flying height). In addition, one end of the wiring member 324 is electrically connected to a terminal electrode of the thermally assisted magnetic head 1. Furthermore, the structure of the suspension 320 in the present embodiment is also not limited to the structure above.

As shown in FIG. 8, the thermally assisted magnetic head 1 in the present embodiment includes a slider 10 and a light source unit 50. The slider 10 is formed with ALTIC ($Al_2O_3$—TiC) and the like, and includes a slider substrate 11 having an air bearing surface (ABS) 11a as a recording medium opposite surface processed so as to obtain appropriate flying height, and a head part 12 formed on an element formation surface 11b perpendicular to the ABS 11a.

Further, the light source unit 50 is made of ALTIC (Al$_2$O$_3$—TiC) and the like, and includes a unit substrate 51 having a bonding surface 51a, and a laser diode 60 as a light source provided on a light source installation surface 51b perpendicular to the bonding surface 51a.

Herein, the slider 10 and the light source unit 50 are adhered to each other while the back surface 11c of the slider substrate 11 and the bonding surface 51a of the unit substrate 51 contact one another. The back surface 11c of the slider substrate 11 refers to an end surface, which is on the side opposite to the ABS 11a of the slider 11. Furthermore, the thermally assisted magnetic head 1 in the present embodiment may be in a form where the laser diode 60 is directly mounted onto the slider 10 without using the light source unit 50.

The head part 12 formed on an element formation surface 11b of the slider substrate 11 includes a head element 20 having an MR element 21 for reading data from the magnetic disks 301 and an electromagnetic transducer element 22 for writing the data into the magnetic disks 301, a waveguide 23 for guiding laser light from the laser diode 60 that is included in the light source unit 50 to a recording medium opposite surface side, a plasmon-generator 24 configuring a NF light generation optical system along with the waveguide 23, a protective layer 31 formed on the element formation surface 11b so as to cover the MR element 21, the electromagnetic transducer element 22, the waveguide 23 and the plasmon-generator 24, a pair of first terminal electrodes 25a that are exposed on an upper surface of the protective layer 31, and that are electrically connected to the MR element 21, and a pair of second terminal electrodes 25b exposed on the upper surface of the protective layer 31, and that are electrically connected to the electromagnetic transducer element 22. The first and second terminal electrodes 25a and 25b are electrically connected to a connection pad of the wiring member 324 provided at the flexure 322 (see FIG. 7).

At one end of the MR element 21, the electromagnetic transducer element 22, the plasmon-generator 24 and the waveguide 23 reach a head end surface 12a that is a recording medium opposite surface of the head part 12. Herein, the head end surface 12a and the ABS 11b constitute the recording medium opposite surface of the entire thermally assisted magnetic head 1.

At the time of actual writing or reading, the thermally assisted magnetic head 1 hydrodynamically flies above the surface of the rotating magnetic disk 301 with a predetermined flying height. On this occasion, the end surfaces of the MR element 21 and the electromagnetic transducer element 22 face the surface of the magnetic recording layer of the magnetic disk 301 via appropriate magnetic spacing. In this state, the MR element 21 senses a data signal magnetic field from the magnetic recording layer and performs reading, and the electromagnetic transducer element 22 applies the data signal magnetic field to the magnetic recording layer and performs writing.

During writing, laser light that has propagated from the laser diode 60 of the light source unit 50 through the waveguide 23 is coupled with the plasmon-generator 24 in the surface plasmon mode, and excites the surface plasmon in the plasmon-generator 24. NF light is generated at the end portion of the head end surface 12a side of the plasmon-generator 24 because the surface plasmon propagates the plasmon-generator 24 toward the head end surface 12a. The NF light reaches the surface of the magnetic disk 301 and heats the magnetic recording layer portion of the magnetic disk 301, causing a reduction of the anisotropy field of the portion to a value that enables writing. Application of the writing magnetic field to the portion where the anisotropy field has been reduced enables thermally assisted magnetic recording.

Figure 9:
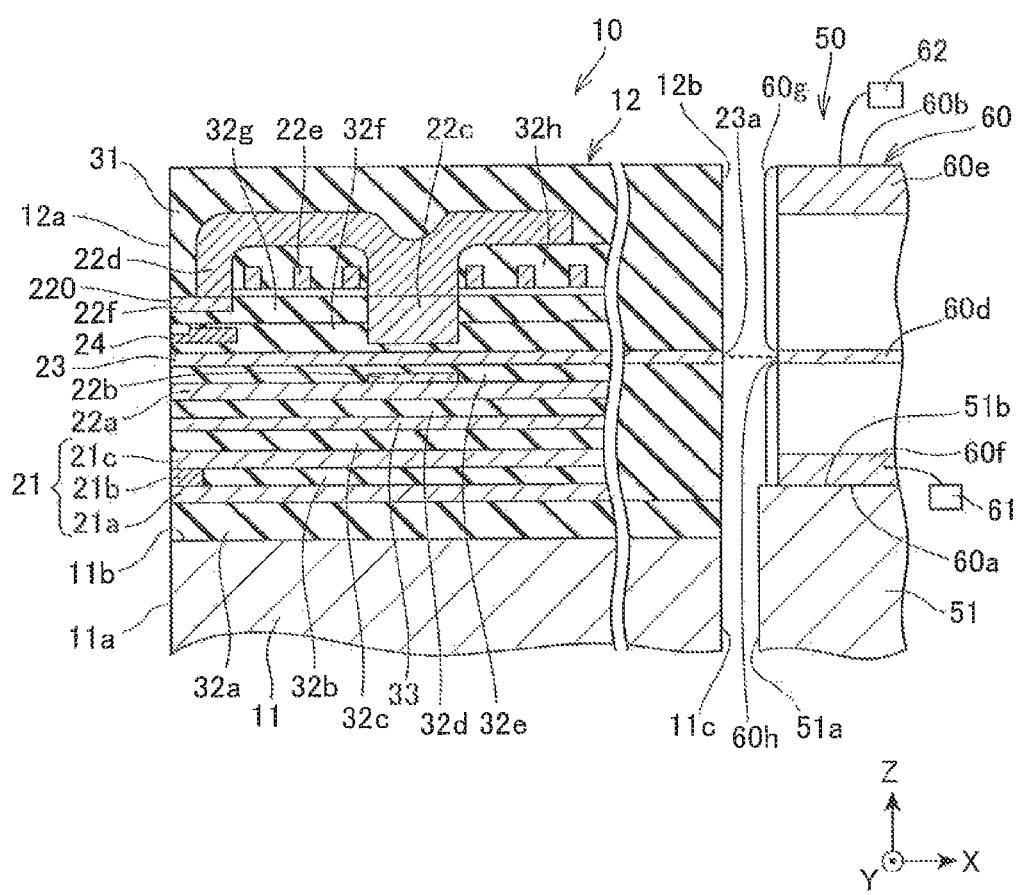
FIG. 9 is a cross-sectional view (XZ plane) along the line A-A in FIG. 8 schematically showing the configuration of a main part of the magnetic head in one embodiment of the present invention.

FIG. 9 is a cross sectional view (XZ plane) along the line A-A in FIG. 8 schematically showing the configuration of the thermally assisted magnetic head 1 in the present embodiment.

As shown in FIG. 9, the MR 21 has a lower shield layer 21a formed on an insulation layer 32a on the element formation surface 11b of the slider substrate 11, an MR multilayer body 21b formed on the lower shield layer 21a, and an upper shield layer 21c formed on the MR multilayer body 21b, and an insulation layer 32b is provided between the lower shield layer 21a and the upper shield layer 21c around the periphery of the MR multilayer body 21b. The lower shield layer 21a and the upper shield layer 21c prevent the MR multilayer body 21b from being affected by an external magnetic field that becomes noise.

The lower shield layer 21a and the upper shield layer 21c are magnetic layers having a thickness of approximately 0.5 µm to 3 µm formed by, for example, a frame plating or sputtering method, and are made of a soft magnetic material, such as NiFe (permalloy), FeSiAl (sendust), CoFeNi, CoFe, FeN, FeZrN, CoZrTaCr, or, a multilayer film of these materials.

The MR multilayer body 21b is a magnetically sensitive part that senses a signal magnetic field utilizing the MR effect, and can be, for example, any one of a Current In Plane-Giant Magnetoresistive (CIP-GMR) multilayer body utilizing an in-plane current-passage type giant magnetoresistance effect, a Current Perpendicular to Plane-Giant Magnetoresistive (CPP-GMR) multilayer body utilizing a perpendicular current-passage type giant magnetoresistance effect, or a Tunnel-Magnetoresistive multilayer body utilizing a tunnel magnetic magnetoresistance effect. Furthermore, when the MR multilayer body 21b is a CPP-GMR multilayer body or TMR multilayer body, the lower shield layer 21a and the upper shield layer 21c also fulfill the role of an electrode. In the meantime, when the MR multilayer body 21b is a CIP-GMR multilayer body, insulation layers are provided between the MR multilayer body 21b and the lower shield layer 21a, and between the MR multilayer body 21b and the upper shield layer 21c, respectively, and an MR lead layer that is electrically connected to the MR multilayer body 21b is further provided.

When the MR multilayer body 21b is a TMR multilayer body, the MR multilayer body 21b has a sequentially laminated structure of an antiferromagnetic layer having a thickness of approximately 5 nm to 15 nm and made from, for example, IrMn, PtMn, NiMn or RuRhMn; a magnetization pinned layer that has a structure where a non-magnetic metallic layer, such as Ru, is between two ferromagnetic layers made from, for example, CoFe, and where its magnetization direction is pinned by the antiferromagnetic layer; a tunnel barrier layer made from a non-magnetic dielectric material where a metallic film with a thickness of approximately 0.5 nm to 1 nm and made from, for example, Al, AlCu or Mg, is oxidized by oxygen introduced into a vacuum device or natural oxidation; and a magnetization free layer that is configured with two-layer films of CoFe with approximately 1 nm of thickness and NiFe with a thickness of approximately 3 nm to 4 nm that are ferromagnetic materials, and that forms a tunnel exchange coupling with the magnetization pinned layer via the tunnel barrier layer.

The head part 12 in the present embodiment includes a non-magnetic layer 32c provided on the upper shield layer 21c; an interelement shield layer 22 provided on the non-magnetic layer 32c; and an insulation layer 32d provided on the interelement shield layer 33. This interelement shield layer 33 may be formed of a soft magnetic material, and has the function the MR element 21 from the magnetic field generated in the electromagnetic transducer element 22 provided on the insulation layer 32d. Furthermore, the non-magnetic layer 32c and the interelement shield layer 33 may be omitted.

The electromagnetic transducer element 22 is for perpendicular magnetic recording, and includes a lower yoke layer 22a provided on the insulation layer 32d, a first linkage layer 22b provided on the lower yoke layer 22a in a position away from the head end surface 12a in the X-axis direction (height direction), a second linkage layer 22c that continues to the first linkage layer 22b, an upper yoke layer 22d provided on the second linkage layer 22c that does not reach the head end surface 12a, a writing coil 22e having a spiral structure wound around the second linkage layer 22c so as to pass between the lower yoke layer 22a and the upper yoke layer 22d at least once during one turn, and a magnetic pole 22f that continues to the upper yoke layer 22d, and that reaches the head end surface 12a so as to be a portion of the head end surface 12a.

The head part 12 in the present embodiment includes a dielectric layer 32e provided on the lower yoke layer 22a, a dielectric layer 32f provided around the periphery of the second linkage layer 22c and the periphery of the plasmon-generator 24, a non-magnetic layer 32g provided on the dielectric layer 32f, an insulation layer 32h provided in an interwinding of the writing coil 22e and around its periphery, and a protective layer 31 provided on the upper yoke layer 22d.

In the head part 12 in the present embodiment, the lower yoke layer 22a, the first linkage layer 22b, the second linkage layer 22c, the upper yoke layer 22d and the magnetic pole 22f configure a waveguide for passing a magnetic flux corresponding to the magnetic field generated by the writing coil 22e, and for guiding the magnetic flux to the magnetic recording layer (perpendicular magnetization layer) of the magnetic disk 301. A portion on the end surface 220 of the magnetic pole 22f, which constitutes a portion of the head end surface 12a, situated the closest to the leading side is a point to generate a writing magnetic field.

The magnetic pole 22f is preferably formed of a soft magnetic material having a higher saturation magnetic flux density than the upper yoke layer 22d, and for example, is formed of a soft magnetic material, such as FeNi, FeCo, FeCoNi, FeN or FeZrN, which are an iron-series alloy materials that consist mainly of Fe. Furthermore, the thickness of the magnetic pole 22f in the Z-axis direction can be set from 0.1 μm to 0.8 μm.

Further, a width of the magnetic pole 22f in the Y-axis direction is preferably 0.2 μm to 0.4 μm. If the width of the magnetic field 22f in the Y-axis direction is within the above range, a magnetic field having writable intensity can be appropriately applied to a heating spot of the magnetic disk 301 heated by NF light irradiated from a NF light generating portion of the plasmon-generator 24.

An end surface of the upper yoke layer 22d at the head end surface 12a side does not reach the head end surface 12a, but is positioned at a recess location at the head rear end surface 12b side by a predetermined distance along the X-axis direction from the head end surface 12a. This enables to focus magnetic flux to the magnetic pole 22f, and enables the intensity of a magnetic field generated from the magnetic pole 22f to be enhanced.

The writing coil 22e is formed from a conductive material, for example, Cu (copper). Furthermore, although the writing coil 22e has one layer in the present embodiment, it can be two or more layers, or can be a helical coil arranged so as to interpose the upper yoke layer 22d. Further, the number of windings of the writing coil 22e is not particularly limited, but for example, can be set to 2 to 7 turns.

The lower yoke layer 22a is formed on the insulation layer 32d made from an insulation material, such as $Al_2O_3$ (alumina), and function as a waveguide to guide the magnetic flux that is returned from a soft magnetic under layer provided under the magnetic recording layer (perpendicular magnetization layer) of the magnetic disk 301. The lower yoke layer 22a is formed from a soft magnetic material, and its thickness is, for example, approximately 0.5 μm to 5 μm.

The waveguide 23 extends to the front end surface 23b, which constitutes a portion of the head front end surface 12a, from the rear end surface 23a, which constitutes a portion of the head rear end surface 12b. The plasmon-generator 24 is provided so as to face the waveguide 23 below the magnetic pole 22f (at the leading side) at predetermined intervals. The waveguide 23 and the plasmon-generator 24 constitute an optical system for NF light generation within the head part 12. Further, a portion between the upper surface (a portion of the side surface) of the waveguide 23 and the lower surface of the plasmon-generator 24 is a buffer portion 40 having a lower refractive index than that of the waveguide 23.

The buffer portion 40 fulfills the role of coupling laser light that propagates through the waveguide 23 with the plasmon-generator 24 in the surface plasmon mode. Furthermore, the buffer portion 40 may be a portion of the dielectric layer 32f, or may be a new layer provided separately from the dielectric layer 32f.

Furthermore, the specific configurations of the magnetic pole 22f, the waveguide 23 and the plasmon-generator 24 are described later.

As shown in FIG. 9, the light source unit 50 includes a unit substrate 51, a laser diode 60 provided on a light source installation surface 51b of the unit substrate 51, a first drive terminal electrode 61 that is electrically connected to an electrode constituting a lower surface 60a of the laser diode 60 (see FIG. 8), and a second drive terminal electrode 62 electrically connected to an electrode constituting the upper surface 60b of the laser diode 60 (see FIG. 8). The first and second drive terminal electrodes 61 and 62 are electrically connected to a connection pad of the wiring member 324 (see FIG. 7) provided at the flexure 322 (see FIG. 7). If a predetermined drive current is applied to the laser diode 60 via the first and second drive terminal electrodes 61 and 62, laser light is emitted from an emission center positioned on an emission surface 60c of the laser diode 60. Herein, in the head structure as shown in FIG. 9, it is preferable that the oscillation direction of the electric field of laser light generated by the laser diode 60 be perpendicular (Z-axis direction) with respect to the lamination layer plane of the active layer 60d. In other words, it is preferable that laser light generated by the laser diode 60 be polarized light in the TM mode. This enables the laser light propagating the waveguide 23 to be appropriately coupled with the plasmon-generator 24 in the surface plasmon mode via the buffer portion 40.

As the laser diode 60, materials that are normally used for communication, for optical system disk storage or for material analysis, such as InP-series, GaAs-series or GaN-series, can be used, and the wavelength XL of laser light to be emitted should be within the range of for example, 375 nm to 1.7 μm.

Specifically, for example, an InGaAsP/InP quaternary mixed crystal-system laser diode having, for example, a possible wavelength region of 1.2 μm to 1.67 μm is usable. The laser diode 60 has a multilayer structure including an upper electrode 60e, an active layer 60d and a lower electrode 60f. Reflective layers for exciting oscillation due to total reflection are formed in front and at the rear of a cleavage surface of this multilayer structure, and an opening is provided in the position of the active layer 60d including the emission center 60h. Herein, the thickness of the laser diode 60 can be, for example, approximately 60 μm to 200 μm.

Further, as a driver for the laser diode 60, a power source within a thermally assisted magnetic disk device is usable. Actually, the thermally assisted magnetic disk device normally includes, for example, approximately 5 V of a power source, and has sufficient voltage in the laser oscillation operation. Further, the power consumption of the laser diode 60 is also, for example, approximately tens of mW, and can be sufficiently covered with the power source within the thermally assisted magnetic disk device. Actually, a predetermined voltage is applied between the first drive terminal electrode 61 electrically connected to the lower electrode 60f and the second drive terminal electrode 62 electrically connected to the upper electrode 60e due to the power source, and laser light is emitted from the opening including the emission center 60h of the reflective layer 60g by oscillating the laser diode 60. Further, in the laser diode 60, the first and second drive terminal electrodes 61 and 62 are not limited to the embodiment described above. For example, in the laser diode 60, the electrode may be turned upside down, and the upper electrode 60e may be adhered to a light source installation surface 51b. Further, it is also possible to optically connect the laser diode with the waveguide 23 by disposing the laser diode on the element formation surface 11b of the thermally assisted magnetic head 1. In addition, the thermally assisted magnetic head 1 does not include a laser diode 60, and the emission center of the laser diode provided within the thermally assisted magnetic disk device and the rear end surface 23a of the waveguide 23 may be connected using, for example, an optical fiber.

The size of the slider 10 and the power source unit 50 is optional; for example, the slider 10 may be a so-called femto slider with 700 μm of width in the track width direction (Y-axis direction)×850 μm of length (in Z-axis direction)×230 μm of thickness (in X-axis direction). In this case, the light source unit 50 may be slightly smaller than this in size; for example, the light source unit 50 may have the width of 425 μm in the track width direction×the length of 300 μm×the thickness of 300 μm.

The thermally assisted magnetic head 1 is configured by connecting the light source unit 50 and the slider 10 described above. In this connection, although a bonding surface 51a of the unit substrate 51 and the back surface 11c of the slider substrate 11 are contacted, at the time, the positions of the unit substrate 51 and the slider substrate 11 are determined so as to allow the laser light generated from the laser diode 60 to enter into the rear end surface 23a, located at the opposite side from the ABS 11a in the waveguide 23.

Figure 10:
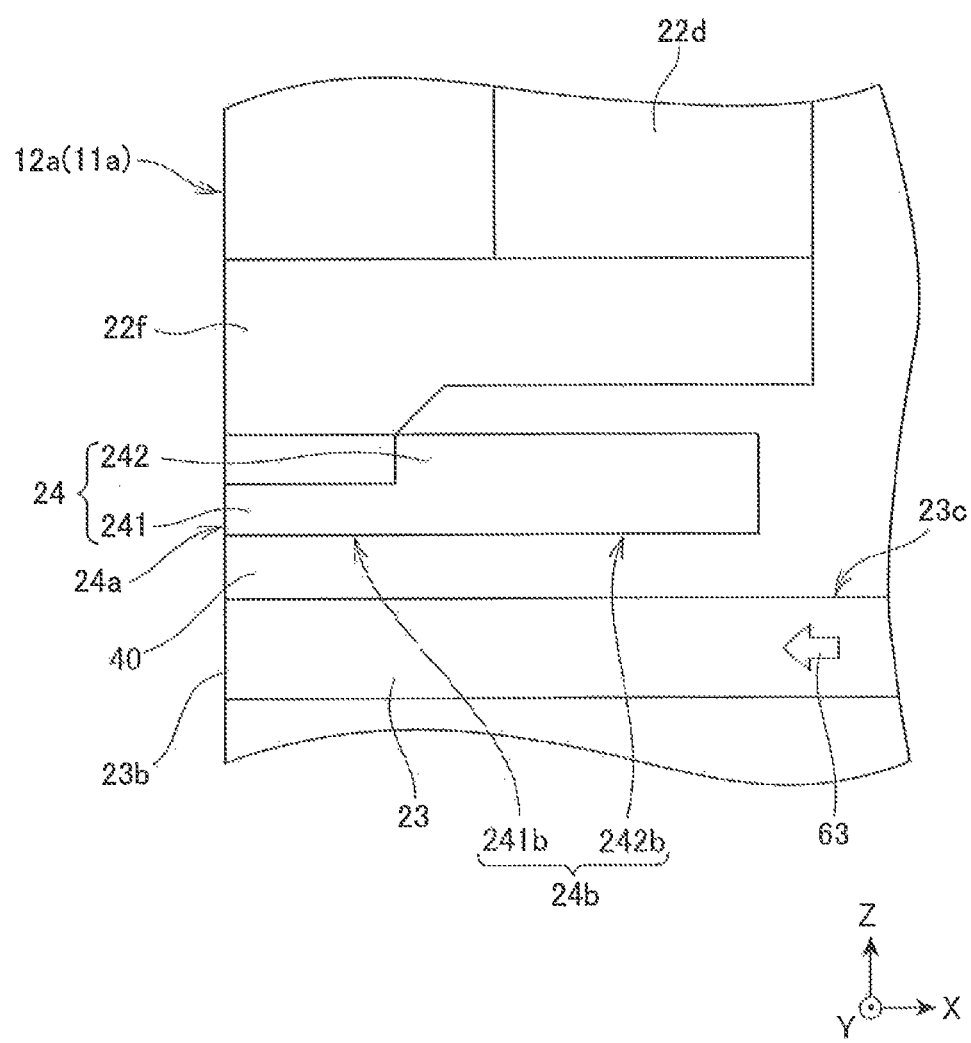
FIG. 10 is a cross-sectional view (XZ plane) schematically showing the configuration of a waveguide, a plasmon-generator and a magnetic pole in a thermally assisted magnetic head in one embodiment of the present invention.

Next, a specific configuration of the waveguide 23, the plasmon-generator 24 and the magnetic pole 22f in the thermally assisted magnetic head 1 in the present embodiment is explained. FIG. 10 is a cross-sectional view schematically showing the configuration of the waveguide 23, the plasmon-generator 24 and the magnetic pole 22f in the thermally assisted magnetic head 1 relating to the present embodiment.

As shown in FIG. 10, the thermally assisted magnetic head 1 in the present embodiment includes a waveguide 23 for propagating laser light 63 for NF light generation and a plasmon-generator 24 where the surface plasmon excited by the laser light (waveguide light) 63 propagates.

The plasmon-generator 24 has a NF light generating end surface 24a that has reached the head end surface 12a. Further, a portion between a portion of the side surface 23c of the waveguide 23 and the lower surface 24b of the plasmon-generator 24 becomes the buffer portion 40. The buffer portion 40 fulfills the role of coupling the laser light (waveguide light) with the plasmon-generator 24 in the surface plasmon mode. Further, the lower surface 24b of the plasmon-generator 24 fulfills the role of propagating the surface plasmon excited by the laser light (waveguide light) to the NF light generating end surface 24a.

Furthermore, in the present embodiment, the side surface of the waveguide 23 indicates an end surface other than the front end surface 23b and the rear end surface 23a that faces that front end surface 23a out of end surfaces surrounding the waveguide 23. The side surface of the waveguide 23 becomes a surface where propagating laser light (waveguide light) can be totally reflected in the waveguide 23 equivalent to the core. Furthermore, in the present embodiment, the side surface 23c of the waveguide 23 where a portion makes contact with the buffer portion 40 is an upper surface of the waveguide 23.

More specifically, the laser light (waveguide light) that has propagated to the vicinity of the buffer portion 40 is coupled with an optical configuration of the plasmon-generator 24 composed of the waveguide 23 having a predetermined refractive index $n_{WG}$, the buffer portion 40 having a predetermined refractive index $n_{BF}$ and a conductive material, such as metal, to excite the surface plasmon mode on the lower surface 24b (surface) of the plasmon-generator 24. In other words, the laser light is coupled with the plasmon-generator 24 in the surface plasmon mode. It becomes possible to induce the surface plasmon mode by setting the refractive index $n_{BF}$ of the buffer portion 40 to be smaller than the refractive index $n_{WG}$ of the waveguide 23 ($n_{BF} < n_{WG}$). Actually, from the optical interface conditions between the waveguide 23 that is the core, and the buffer portion 40, evanescent light is excited within the buffer portion 40. Next, the surface plasmon mode is induced in a form where the evanescent light is coupled with fluctuation of an electric charge excited on the surface of the plasmon-generator 24, and the surface plasmon 70 (see FIG. 11) is excited.

Space (the thickness of the buffer portion 40 immediately under the plasmon-generator 24) between the upper surface (opposing surface with the plasmon-generator 24) of the waveguide 23 and the lower surface 24b of the plasmon-generator 24 is not particularly limited as long as the surface plasmon 70 can be excited on the lower surface 24b of the plasmon-generator 24.

The plasmon-generator 24 has a first PG part 241 extending from the ABS 11a in the perpendicular direction with respect to the ABS 11a and a second PG part 242 that continues to the first PG part 241 on the back side from the ABS 11a.

A lower surface 241b of the first PG part 241 and the lower surface 242b of the second PG part 242 are configured to be co-planar. The lower surface 24b of the plasmon-generator 24 configured with the lower surface 241b of the first PG part 241 and the lower surface 242b of the second PG part 242 faces the waveguide 23 via the buffer portion 40, and the lower surface 241b of the first PG part 241 extends to the NF light generating end surface 24a. Due to this configuration, the role of propagating the surface plasmon excited by laser light (waveguide light) which has propagated through the waveguide 23, to the NF light generating end surface 24a can be fulfilled. In other words, the plasmon-generator 24 is coupled with the waveguide light in the surface plasmon mode, and propagates the surface plasmon on the lower surfaces 241b and 242b of the first PG part 241 and the second PG part 242, and finally propagates the surface plasmon to the NF light generating end surface 24a via the lower surface 241b of the first PG part 241. As a result, NF light is generated from the NF light generating portion NFP on the NF light generating end surface 24a.

In the plasmon-generator 24, the second PG part 242 has a front end continuing to the first PG part 241 and a rear end positioned at the back side more than the front end portion. Then, the width of the plasmon-generator 24 (second PG part 242) in the track width direction (Y-axis direction) is gradually increased from the front end of the second PG part 242 toward the rear end portion. Because the second PG part 242 has such shape, the surface plasmon is efficiently excited on the lower surface 242b of the second PG part 242 having a relatively-wide area, and the surface plasmon propagating the lower surface 242b of the second PG part 242 can be focused toward the end surface 241a (NF light generating end surface 24a) of the first PG part 241. As a result, NF light with desired intensity can be generated.

As the shape of the waveguide 23, although the width in the track width direction (Y-axis direction) may be constant, the width in the track width direction (Y-axis direction) may become narrower in the portion positioned in the vicinity of the ABS 11a. The width in the track width direction (Y-axis direction) in the portion at the rear end surface 23a side, positioned at the opposite side of the front end surface 23b of the waveguide 23, can be, for example, approximately 0.5 µm to 20 µm, and the width in the track width direction (Y-axis direction) in the portion at the front end surface 23b side can be, for example, approximately 0.3 µm to 10 µm, the thickness in the Z-axis direction can be approximately 0.1 µm to 4 µm, and the height (length) in the X-axis direction can be, for example, approximately 10 µm to 300 µm.

The upper surface 23c of the waveguide 23 and both end surfaces in the track width direction (Y-axis direction) make contact with the dielectric layer 32f (see FIG. 9) except for a portion contacting the buffer portion 40, and the lower surface of the waveguide 23 contacts the dielectric layer 32e (see FIG. 9). Herein, the waveguide 23 is formed of a material having a refractive index $n_{WG}$ which is higher than a refractive $n_{IS}$ of constituent materials of the dielectric layer 32e and the dielectric layer 32f. For example, when the wavelength $\lambda_L$ of a laser light is 600 nm, and the dielectric 32e and the dielectric layer 32f are made from $SiO_2$ (silicon dioxide; n=L46), the waveguide 23 may be made from $Al_2O_3$ (alumina; n=1.63). In addition, when the dielectric 32e and the dielectric layer 32f are made from $Al_2O_3$ (n=1.63), the waveguide 23 may be made from $SiO_XN_Y$ (n=1.7 to 1.85), $Ta_2O_5$ (n=2.16), $Nb_2O_5$ (n=2.33), TiO (n=2.3 to 2.55) or $TiO_2$ (n=2.3 to 2.55). The configuration of the waveguide 23 with such materials enables a propagation loss of the laser light (waveguide light) to be kept low due to excellent optical characteristics in the materials themselves. In addition, the waveguide 23 functions as a core; in the meantime, the dielectric layer 32e and the dielectric layer 32f fulfill a function as a cladding, and total reflection conditions on all side surfaces are restored. Due to this, more laser light (waveguide light) 63 reaches the position of the buffer portion 40, improving the propagation efficiency of the waveguide 23.

Further, the waveguide 23 has a multilayer structure of dielectric material(s), and may have a structure where the higher the layer is situated, the higher the refractive index n becomes. For example, such a multilayer structure is realized by sequentially laminating a dielectric material where values for X and Y in a composition ratio, for example, of $SiO_XN_Y$ are appropriately changed. The number of laminations can be, for example, 8 to 12 layers. As a result, if the laser light (waveguide light) is a linear polarized light in the Z-axis direction, the laser light (waveguide light) can be propagated more to the buffer portion 40 side in the Z-axis direction. As a result, a desired propagation position of the laser light (waveguide light) can be realized by selecting the composition, layer thickness and the number of layers of each layer in this multilayer structure.

The buffer portion 40 is made from a dielectric material having a refractive index $n_{BF}$, which is lower than the refractive index $n_{WG}$ of the waveguide 23. For example, when the wavelength XL of the laser light is 600 nm and the waveguide 23 is made from $Al_2O_3$ (alumina; n=1.63), the buffer portion 40 may be made from $SiO_2$ (silicon dioxide; n=1.46). Further, when the waveguide 23 is made from $Ta_2O_5$ (n=2.16), the buffer portion 40 may be made from $SiO_2$ (n=1.46) or $Al_2O_3$ (n=1.63). In these cases, this buffer portion 40 can be a portion of the dielectric layer 32f (see FIG. 9) as a cladding made from $SiO_2$ (n=1.46) or $Al_2O_3$ (n=1.63). Further, it is preferable that length of the buffer portion 40 (in X-axis direction), between the upper surface 23c of the waveguide 23 and the lower surface 24b of the plasmon-generator 24, is 0.5 µm to 5 µm, and that its wavelength be greater than the wavelength $\lambda_L$ of the laser light (waveguide light). In this case, the portion becomes a much wider region compared to the so-called "focal region" in the case when laser light is collected on the buffer portion 40 and the plasmon-generator 24 and is coupled in a surface plasmon mode, and a very stable coupling in surface plasmon mode becomes possible. Further, the thickness of the buffer portion 40 (in the Z-axis direction) is preferably 10 nm to 200 nm. Length (in the X-axis direction) and thickness (in the Z-axis direction) of the buffer portion 40 become important parameters for obtaining appropriate excitation and propagation of the surface plasmon.

The magnetic pole 22f has reached the head end surface 12a, and the end surface on the head end surface 12a of the magnetic pole 22f has, for example, substantially rectangular shape, such as rectangle, square or trapezoid.

The specific configuration of the thermally assisted magnetic disk device is one example of a thermally assisted magnetic disk device where the evaluation method for characteristics relating to the present embodiment is applicable, and the configuration of the thermally assisted magnetic disk device as the subject for characteristic evaluation is not limited to the above-mentioned embodiment.

Figure 11:
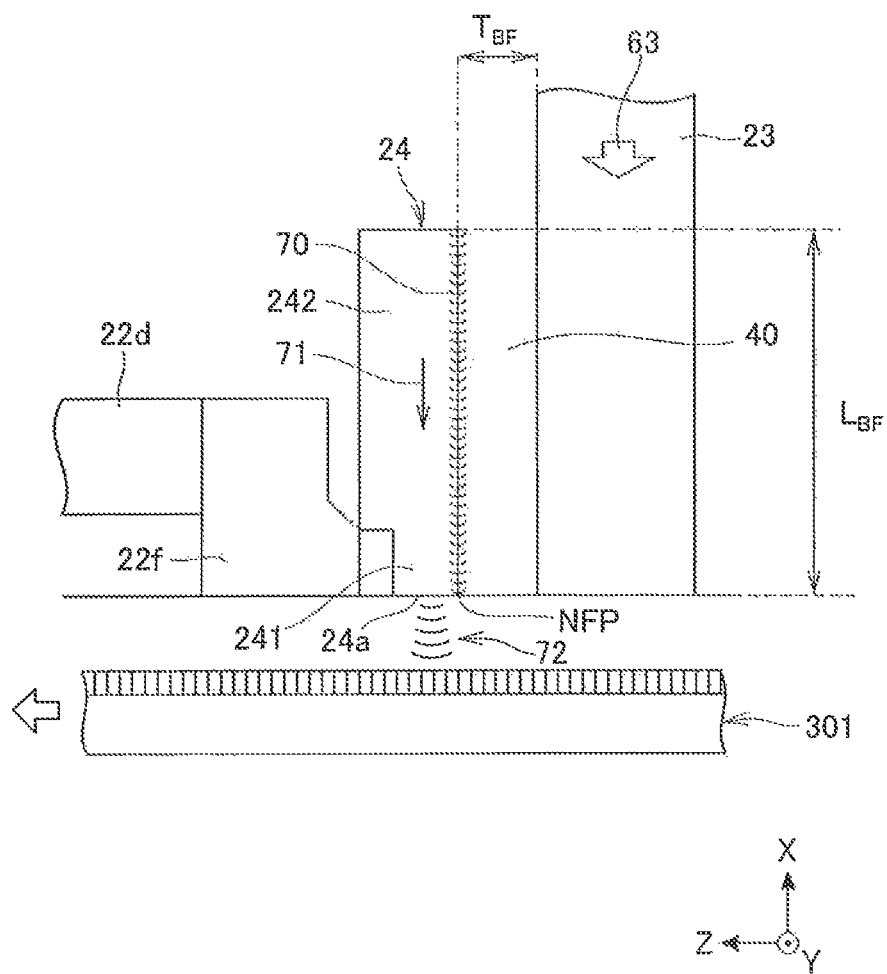
FIG. 11 is a cross-sectional view (XZ plane) schematically showing a thermally assisted magnetic recording method utilizing a surface plasmon mode in the magnetic head in one embodiment of the present invention.

Next, operation of the magnetic head 1 having the above configuration in the present embodiment is explained. FIG. 11 is schematic view for explaining thermally assisted magnetic recording utilizing the surface plasmon mode in the magnetic head 1 in the present embodiment.

As shown in FIG. 11, on the occasion of writing onto a magnetic recording layer of the magnetic disk 301 by the electromagnetic transducer element 22, at first, the laser light (waveguide light) 63 emitted from the laser diode 60 of the light source unit 50 propagates through the waveguide 23. Next, the laser light (waveguide light) 63 that has progressed to the vicinity of the buffer portion 40 is coupled with the optical configuration of the plasmon-generator 24 made of the waveguide 23 having the refractive index $n_{WG}$, and the buffer portion 40 having the refractive index $n_{BF}$ and the conductive material, such as metal, and induces the surface plasmon mode on the lower surface 24b of the plasmon-generator 24. In other words, the laser light (waveguide light) 63 is coupled with the plasmon-generator 24 in the surface plasmon mode. Actually, an evanescent light is excited within the buffer portion 40 from the optical interface conditions of the waveguide 23 that is a core, and the buffer portion 40. Next, the surface plasmon mode is induced in a form where the evanescent light is coupled with the fluctuation of an electric charge excited on the metallic surface (lower surface 24b) of the plasmon-generator 24, and the surface plasmon is excited. Furthermore, precisely, since the surface plasmon, which is an elementary excitation in this system, is coupled with electromagnetic waves, what is excited is a surface plasmon polariton. However, hereafter, abbreviated, the surface plasmon polariton is referred in abbreviated form as surface plasmon. It becomes possible to excite the surface plasmon mode by setting the refractive index $n_{BF}$ of the buffer portion 40 to be smaller than the refractive index $n_{WG}$ of the waveguide 23 ($n_{BF} < n_{WG}$), and in addition, by appropriately selecting the length $L_{BF}$ of the buffer portion 40 in the X-axis direction, i.e., the length of the coupled portion of the waveguide 23 and the plasmon-generator 24, and thickness $T_{BF}$ of the buffer portion 40 in the Z-axis direction.

In the induced surface plasmon mode, the surface plasmon 70 is excited on the lower surface 24b of the plasmon-generator 24, and propagates along the direction of the arrow 71. Since the lower surface 24b does not make contact with the magnetic pole 22f, it will not be adversely affected by the magnetic pole 22f, which is not adjusted to efficiently excite the surface plasmon. As a result, it is possible to intentionally propagate the surface plasmon on the lower surface 24b.

Consequently, the surface plasmon 70, i.e. an electric field, is focused onto the NF light generating portion NFP on the NF light generating end surface 24a, which has reached the head end surface 12a, and where the lower surface 24b is leading, because the surface plasmon 70 propagates on the lower surface 24b in the direction of the arrow 71. As a result, NF light 72 is generated from the N light generating portion NFP. The NF light 72 is irradiated toward the magnetic recording layer of the magnetic disk 301, and reaches the surface of the magnetic disk 301 to heat the magnetic recording layer portion of the magnetic disk 301. Consequently, the anisotropy field (coercive force) of that portion is reduced to a value that enables writing to be performed, and the writing is performed by the magnetic field applied to that portion.

According to the method for evaluating characteristics relating to the present embodiment, the MWW as the recording characteristic of the thermally assisted magnetic head in the thermally assisted magnetic disk device having the configuration above can be accurately evaluated.

The embodiment explained above has been mentioned in order to facilitate the understanding of the present invention, and is not meant to limit the present invention. Therefore, various elements disclosed in the above embodiment are an intent to include all design variation and equivalents within the technical scope of the present invention, as well.

In the above embodiment, the reproduction signal intensity of reference signals recorded in sectors in the geometric track width center are pre-measured, and the reproduction signal intensity in the geometric track width center is subtracted from the reproduction signal intensity of the reference signal measured in a position where the thermally assisted magnetic head has been moved inwardly or outwardly in the track width direction from the center. However, the present invention is not limited to such a mode, and the reproduction signal intensity in the geometric track width center does not have to be obtained.

In the embodiment above, reference signals are recorded on one track of the magnetic disk, and the recording characteristics of the thermally assisted magnetic head are evaluated relative to the mean signal output per sector in one track where the reference signals are recorded as an index, but the present invention is not limited to such a mode. For example, the reference signals are recorded in a plurality of tracks in the magnetic disk, and the recording characteristics of the thermally assisted magnetic head may be evaluated relative to the mean signal output of each sector in each track as an index. Further, the recording characteristics of the thermally assisted magnetic head may be evaluated relative to the mean signal output of partial sectors out of a plurality of sectors included in one track.

In the embodiment above, the mean signal output of each sector is calculated from the reproduction signal intensity of the reference signals recorded in the magnetic disk, and the stability of the MWW as a recording characteristic of the thermally assisted magnetic head is evaluated relative to the mean signal output of each sector as an index, but the present invention is not limited to such a mode. For example, the MWW in the track where the reference signals are recorded may be actually measured, and the recording characteristics of the thermally assisted magnetic head may be evaluated based on the MWW.

The invention claimed is:

1. A method for evaluating recording characteristics of a thermally assisted magnetic head that comprises: a magnetic pole that generates a writing magnetic field from one end surface; a waveguide where light for exciting surface plasmon propagates; a plasmon-generator that generates near-field light from a near-field light generating portion on a near-field light generating end surface positioned on one end surface by coupling the light in a surface plasmon mode; and a light source that irradiates the waveguide with light by applying a predetermined drive current, the method comprising steps of:
    recording a reference signal in each sector of at least one track of a magnetic recording medium by using the thermally assisted magnetic head;
    moving the thermally assisted magnetic head in the track width direction from the track width center of the track where the reference signals are recorded in the magnetic recording medium;
    measuring reproduction signal intensity of the reference signals using the thermally assisted magnetic head in a state where the thermally assisted magnetic head has been moved;
    calculating a mean signal output of each sector of the track where the reference signals are recorded from the measurement results of the reproduction signal intensity of the reference signals; and
    evaluating the recording characteristics of the thermally assisted magnetic head based on the mean signal output of the each sector.

2. The method for evaluating recording characteristics of a thermally assisted magnetic head according to claim 1, wherein
    when the reference signals are recorded in the magnetic recording medium, a drive current that is greater than a design value for a drive current is applied to the light source.

3. The method for evaluating the recording characteristics of a thermally assisted magnetic head according to claim 1, wherein
    the thermally assisted magnetic head is moved inwardly or outwardly by 40 to 60% of a design value of magnetic write width in the thermally assisted magnetic head using the track width center as a standard.

4. The method for evaluating the recording characteristics of the thermally assisted magnetic head according to claim 1, further comprising the step of measuring the reproduction signal intensity of the reference signals in a state where the thermally assisted magnetic head is positioned in the track width center, wherein the mean signal output of each sector in the track where the reference signals are recorded is calculated based on the measurement results of the reproduction signal intensity of the reference signals measured in a state where the thermally assisted magnetic head has been moved, and based on measurement results of the reproduction signal intensity of the reference signals measured in a state where the thermally assisted magnetic head is positioned in the track width center.

5. The method for evaluating the recording characteristics of the thermally assisted magnetic head according to claim 1, wherein when any of the mean signal outputs of the sectors is within the range: ±2.5% of the design value of the track mean signal output, the thermally assisted magnetic head is evaluated as a good product.

6. The method for evaluating recording characteristics of the thermally assisted magnetic head according to claim 5, wherein a maximum value and a minimum value out of the mean signal output of the sectors are extracted, and when both the maximum value and the minimum value of the mean signal outputs are within the range: ±2.5% of the design value of the track mean signal output, the thermally assisted magnetic head is evaluated as a good product.

7. A method for evaluating the recording characteristics of a thermally assisted magnetic head that comprises: a magnetic pole that generates a writing magnetic field from one end surface; a waveguide where a light for exciting surface plasmon propagates; a plasmon-generator that generates near-field light from a near-field light generating portion on a near-field light generating end surface positioned on the one end surface by coupling the light in a surface plasmon mode; and a light source that irradiates the waveguide with light by applying a predetermined drive current, comprising steps of:

recording reference signals on at least one track of a magnetic recording medium using the thermally assisted magnetic head;

measuring magnetic write width of each sector of the track where the reference signals are recorded; and evaluating recording characteristics of the thermally assisted magnetic head based on the magnetic write width of the sectors.

* * * * *